(12) United States Patent
Shimizu et al.

(10) Patent No.: US 7,845,856 B2
(45) Date of Patent: Dec. 7, 2010

(54) GAS VENT PLUG, BEARING DEVICE, AND BEARING

(75) Inventors: Yasuhiko Shimizu, Kuwana (JP); Yukihiro Takeda, Osaka (JP); Hirofumi Yoshida, Fujisawa (JP)

(73) Assignee: NTN Corporation, Osaka (JP)

( * ) Notice: Subject to any disclaimer, the term of this patent is extended or adjusted under 35 U.S.C. 154(b) by 657 days.

(21) Appl. No.: 11/884,387

(22) PCT Filed: Jan. 10, 2006

(86) PCT No.: PCT/JP2006/300117

§ 371 (c)(1),
(2), (4) Date: Aug. 15, 2007

(87) PCT Pub. No.: WO2006/087876

PCT Pub. Date: Aug. 24, 2006

(65) Prior Publication Data

US 2009/0127924 A1    May 21, 2009

(30) Foreign Application Priority Data

Feb. 21, 2005 (JP) ............................ 2005-044262
Feb. 28, 2005 (JP) ............................ 2005-053926

(51) Int. Cl.
*F16C 33/72* (2006.01)
(52) U.S. Cl. ....................................... 384/477; 384/479
(58) Field of Classification Search ................. 384/477, 384/479, 459; 137/843, 844, 845
See application file for complete search history.

(56) References Cited

U.S. PATENT DOCUMENTS

| 2,973,230 | A | * | 2/1961 | Eastburg | 384/466 |
| 3,572,379 | A | * | 3/1971 | Popa et al. | 137/849 |
| 3,833,277 | A | * | 9/1974 | Jones et al. | 384/459 |
| 3,896,849 | A | * | 7/1975 | Ervin et al. | 137/847 |

FOREIGN PATENT DOCUMENTS

| JP | 46-27369 | 9/1971 |
| JP | 56-4506 | 1/1981 |
| JP | 56-24211 | 6/1981 |
| JP | 6-248908 | 9/1994 |
| JP | 2550393 | 10/1997 |
| JP | 2558600 | 12/1997 |
| JP | 2558601 | 12/1997 |
| JP | 11-62996 | 3/1999 |
| JP | 2003-294047 | 10/2003 |

* cited by examiner

*Primary Examiner*—Thomas R Hannon
(74) *Attorney, Agent, or Firm*—McDermott Will & Emery LLP (57) ABSTRACT

A gas vent plug is mounted in an aperture communicating with a bearing cavity, and includes a metal annular body, and an elastic tubular body constituted of an elastic member in tube form, integral with the metal annular body, and having a vent at one end face of the tube, protruding outwards in the axial direction of the tube. A circular groove is provided at one end face of the elastic tubular body so as to encircle the vent. Accordingly, variation in the working pressure is eliminated even in the case where the interference is increased when the gas vent plug is mounted in the aperture.

31 Claims, 7 Drawing Sheets

$t \geq 1.05 ts2$
OR
$t \geq 0.95 tm$

○ COMPARATIVE SAMPLE 1 (TUBE THICKNESS t2 MODERATE)
● COMPARATIVE SAMPLE 2 (TUBE THICKNESS t2 LARGE)
△ SAMPLE 1 OF PRESENT INVENTION (CIRCULAR GROOVE: TUBE THICKNESS t2 LARGE)
◇ SAMPLE 2 OF PRESENT INVENTION (CIRCULAR GROOVE : TUBE THICKNESS t2 LARGE)
□ SAMPLE 3 OF PRESENT INVENTION (BEVELED: TUBE THICKNESS t2 LARGE)
× SAMPLE 4 OF PRESENT INVENTION (THICKNESS t1 AROUND VENT SMALL: TUBE THICKNESS t2 LARGE)

GAS VENT PLUG, BEARING DEVICE, AND BEARING

This application is the U.S. National Phase under 35 U.S.C. §371 of International Application No. PCT/JP2006/300117, filed on Jan. 10, 2006, which in turn claims the benefit of Japanese Application No. 2005-044262, filed on Feb. 21, 2005 and Japanese Application No. 2005-053926, filed on Feb. 28, 2005, the disclosures of which Applications are incorporated by reference herein.

TECHNICAL FIELD

The present invention relates to a gas vent plug, a bearing device, and a bearing employed in railroad vehicles, industrial machines, and the like.

BACKGROUND ART

The main stream of axle bearings employed in railroad vehicles is now the sealed type tapered roller bearing by virtue of the compact axle box and maintenance-free characteristic. By the sealed configuration, the temperature in the bearing may rise due to the increase of the inner pressure in the bearing during operation over a long period of time or at high speed. There is also the possibility of adverse effects on the bearing oil seal, depending upon the condition, to cause heat generation of the oil seal itself. For the purpose of preventing such temperature increase in the bearing as well as development of heat at the seal itself, a gas vent plug is provided to avoid increase of the inner pressure in the bearing. The configurations of a gas vent plug and a bearing device attached with a gas vent plug are conventionally disclosed. For example, Japanese Patent Laying-Open No. 6-248908 (Patent Document 1) discloses a general vent structure, and Japanese Patent Laying-Open No. 2003-294047 (Patent Document 2) discloses a bearing with a vent provided at the bearing itself Patent Document 1: Japanese Patent Laying-Open No. 6-248908Patent Document 2: Japanese Patent Laying-Open No. 2003-294047

DISCLOSURE OF THE INVENTION

Problems to be Solved by the Invention

Figure 13:
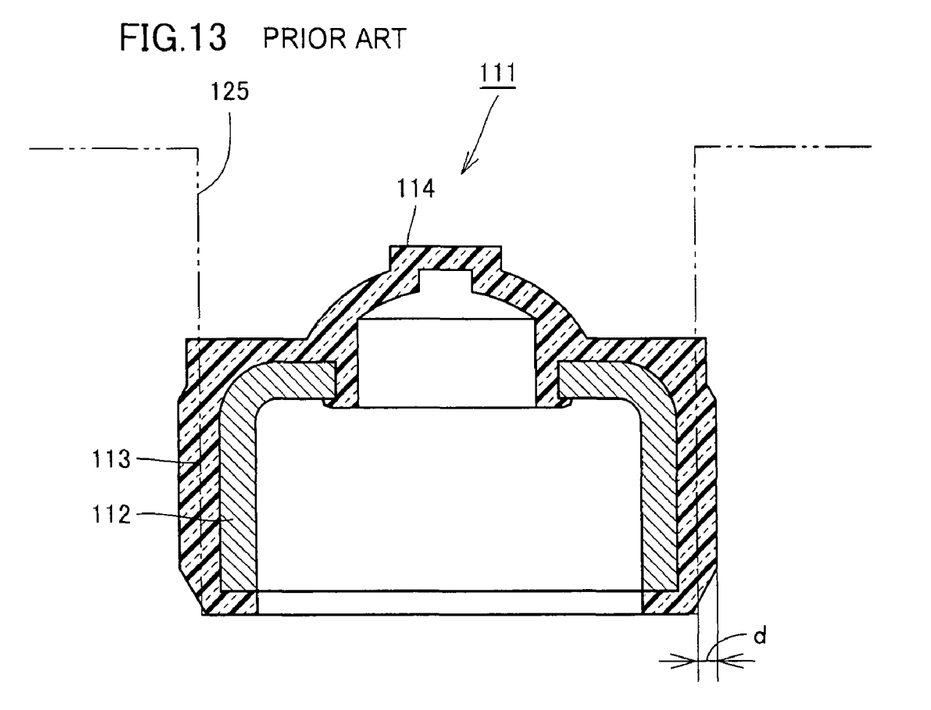
FIG. 13 is a sectional view of a conventional gas vent plug for a bearing.

A conventional gas vent plug in a bearing is configured as shown in FIG. 13, based on the fitting between rubber 113 at the outer side of gas vent plug 111, i.e. covering a metal annulus 112, and an aperture 125 provided at a barking ring or the like fixed at the outer race or inner race not shown to prevent detachment of the gas vent plug. Thus far, the productivity and working cost were improved by increasing the squeeze (interference) d or the squeeze ratio of the rubber around the metal annulus. Specifically, the tolerance of variation in the working dimension of the hole was increased to reduce the processing cost while the interference of the rubber was increased to achieve a greater attachment of the gas vent plug in the hole to prevent detachment.

However, it was not always preferable to increase the interference in order to maintain the working pressure corresponding to the relief of pressure in response to the opening of the slit (discrete part) of vent 114 of the gas vent plug within a predetermined range without variation. There was the need to develop a gas vent plug and a bearing device that can achieve a working pressure within a predetermined range even if the thickness of the rubber tubular body is increased such that the hole diameter comes to the lower limit and the interference of the rubber body for mounting in the hole is increased.

An object of the present invention is to provide a gas vent plug for a bearing, a bearing device, and a bearing that can keep variation of the working pressure within a predetermined range even in the case where the interference of the rubber tubular body for mounting to an aperture is increased.

A conventional gas vent plug in a bearing is formed integral with the metal annulus at the inner side of the tubular rubber. The gas vent plug mounted by the fitting between the rubber located at the outer side of the gas vent plug, i.e. covering the metal annulus and the hole in a barking ring or the like fixed to the outer race or inner race is configured to avoid detachment. To ensure the interference at the fitting face, the tolerance of the hole fabrication is under strict control. Particularly, when an air (gas) vent plug is to be attached in the bearing body, the tolerance must be under more severe control in consideration of deformation due to the heat treatment on the bearing body. This was unfavorable from the standpoint of productivity and working cost.

Another object of the present invention is to provide a gas vent plug for a bearing, a bearing device, and a bearing that allows reduction in the number of steps and cost required to form a hole for mounting of the gas vent plug.

Means for Solving the Subject

According to an aspect of the present invention, a gas vent plug for a bearing is mounted in an aperture communicating with a bearing cavity where a rolling element sandwiched between an outer race and an inner race is located. The gas vent plug includes a metal annular body, and an elastic tubular body constituted of an elastic member in tube form, integral with the metal annular body, and having a vent at one end face of the tube, protruding outwards in an axial direction of the tube. Further, a circular groove is provided at one end face of the elastic tubular body so as to encircle the vent.

According to the configuration set forth above, deformation of the elastic material of the elastic tubular body in the direction of the vent is blocked by the circular groove even if the interference of the elastic tubular body to be mounted in the aperture is increased. Accordingly, the movement of the elastic body at the slit (discrete part) of the vent to act in a direction closing the slit will not occur. Therefore, the discrete part is opened by the working pressure within a predetermined range even if the interference is increased. The elastic tubular body set forth above is formed of rubber, elastic resin or the like. At the top of the protruding vent, a discrete part such as a linear slit or dot-like slit is provided, attaining an open state at a predetermined working pressure according to the pressure increase in the bearing cavity.

According to another aspect of the present invention, a gas vent plug is mounted in an aperture communicating with a bearing cavity where a rolling element sandwiched between an outer race and an inner race is located. The gas vent plug includes a metal annular body, and an elastic tubular body constituted of an elastic member in tube form, integral with the metal annular body, and having a vent at one end face of the tube, protruding outwards in an axial direction of the tube. At a shoulder identified as a boundary region between a tube portion of the elastic tubular body and the one end face, a beveled portion is provided. The thickness at the shoulder is less than the thickness of the tube portion.

According to the configuration set forth above, the movement of the elastic member from the tube portion is suppressed at the beveled portion even if the interference is increased. Increase of the opening block action applied to the slit of the vent can be suppressed.

For the gas vent plug including a beveled portion, the thickness of one end face of the elastic tubular body located around the vent is less than the thickness of the tube portion, and the thickness of the beveled portion is substantially equal to the thickness of the one end face located around the vent. By this configuration, increase in the movement of the elastic tubular body towards the vent caused by increase in the interference for the mounting can be suppressed more reliably.

According to a further aspect of the present invention, a gas vent plug is mounted in an aperture communicating with a bearing cavity where a rolling element sandwiched between an outer race and an inner race is located. The gas vent plug includes a metal annular body, and an elastic tubular body constituted of an elastic member in tube form, integral with the metal annular body, and having a vent at one end face of the tube, protruding outwards in an axial direction of the tube. The thickness of the elastic tubular body at the end face located around the vent is not more than ½ the thickness of the tube portion.

According to the configuration set forth above, increase of the flow of the elastic member caused by increase in the interference for mounting in an aperture will not come as far as the discrete part of the vent such as a slit since the region located around the vent is thin. Thus, increase of the action to close the discrete part at the vent can be suppressed.

In the gas vent plug set forth above, the metal annular body includes an inner rim protruding radially inwards at the end thereof. The inner rim can be brought into contact with the inner plane of the end face where the vent is arranged at the elastic tubular body. By this configuration, the inner pressure of the bearing cavity can be transmitted more sensitively to the vent. Further, the likelihood of increase in the movement of the elastic member caused by increase in the interference at the tube portion coming as far as the discrete part such as the slit located at the top of the vent can be rendered low.

Furthermore, the elastic tubular body can include a flange to hold an end edge of the metal annular body in place in order to suppress deviation with respect to the metal annular body towards the vent. By this configuration, mounting can be effected reliably even if the interference is increased. Further, it serves to suppress the movement of the elastic member. Further, there can be provided a collar at the inner side of the end face where the vent is arranged to hold the inner rim of the metal annular body from the inner side. By this collar, mounting can be effected further reliably even if the interference is increased. Furthermore, movement of the elastic member can be suppressed.

In a configuration in which a circular groove is arranged at the end face located around the vent, the circular groove can be positioned to overlap the inner rim when viewed along the axial direction. By this configuration, increase in the deformation towards the vent caused by interference increase of the elastic tubular body can be suppressed further reliably.

A bearing device according to an aspect of the present invention includes an inner race fixed to a rotating shaft by a fixture member, an outer race, a rolling element located in a bearing cavity sandwiched between an inner race and an outer race, a seal member sealing the bearing cavity, and an aperture communicating with said bearing cavity, provided in any of the outer race, seal member, inner race, and fixture member, or in a member attached to any of the outer race, seal member, inner race and fixture member. Any of the gas vent plugs set forth above is mounted in the aperture.

Since any one of the gas vent plugs set forth above is arranged in the bearing device of the above-described configuration, the gas vent plug mounted in the aperture operates at the expected working pressure so that the inner pressure in the bearing does not rise even if operated continuously for a long period or at high speed while the tube portion of the elastic tubular body is made thick to increase the interference. As a result, increase of the inner pressure can be prevented as expected, as well as suppressing the fabrication cost and the like.

A bearing according to an aspect of the present invention includes an outer race, an inner race, and a gas vent plug mounted in an aperture communicating with a bearing cavity where a rolling element sandwiched between said outer race and inner race is located. The gas vent plug includes a metal annular body, and an elastic tubular body constituted of an elastic member in tube form, integral with the metal annular body, and having a vent at one end face of the tube, protruding outwards in an axial direction of the tube. The elastic tubular body is characterized in that the thickness of the tube portion thereof is at least 105% of the differential thickness between the diameter of the aperture and the outer diameter of the metal annular body in a state where the elastic tubular body is not mounted in the aperture integral with the metal annular body. In a bearing according to another aspect of the present invention, the elastic tubular body is characterized in that the thickness of the tube portion is at least 95% the thickness of the tube portion of the metal annular body in a state where the elastic tubular body is not mounted in the aperture integral with the metal annular body.

According to the configuration set forth above, an aperture is provided at the bearing itself, and a gas vent plug is mounted in the aperture. Since the elastic tubular body has the thickness of the tube portion set to at least 105% of the differential thickness between the diameter of the aperture and the outer diameter of the metal annular body, or at least 95% the thickness of the tube portion of the metal annular body in a state where the elastic tubular body is not mounted in the aperture integral with the metal annular body, a large interference is allowed for mounting in the aperture. Therefore, the processing tolerance of the diameter of the aperture formed at the bearing can be alleviated to reduce the fabrication cost.

A bearing device according to another aspect of the present invention includes an inner race fixed to a shaft by a fixture member, an outer race, a rolling element located at a bearing cavity sandwiched between the inner race and outer race, a seal member sealing the bearing cavity, an aperture communicating with the bearing cavity, provided in any of the outer race, seal member, inner race, and fixture member, or in a member attached to any of the outer race, seal member, inner race and fixture member, and a gas vent plug mounted in the aperture. The gas vent plug includes a metal annular body, and an elastic tubular body constituted of an elastic member in tube form, integral with the metal annular body, and having a vent at one end face of the tube, protruding outwards in an axial direction of the tube. The elastic tubular body is characterized in that the thickness of the tube portion is at least 105% the differential thickness between the diameter of the aperture and the outer diameter of the metal annular body in a state where the elastic tubular body is not mounted in the aperture integral with the metal annular body. In the bearing device according to a further aspect of the present invention, the elastic tubular body set forth above is characterized in that the thickness of the tube portion is at least 95% the thickness of the tube portion of the metal annular body in a state where the elastic tubular body is not mounted in the aperture integral with the metal annular body.

In the configuration set forth above, an aperture is provided at the aforementioned site of the bearing device, communicating with the bearing cavity, and a gas vent plug is mounted in the aperture. Since the elastic tubular body has the thickness of the tube portion set to at least 105% of the differential thickness between the diameter of the aperture and the outer diameter of the metal annular body, or at least 95% the thickness of the tube portion of the metal annular body in a state where the elastic tubular body is not mounted in the aperture integral with the metal annular body, a large interference is allowed for mounting in the aperture. Therefore, the working tolerance of the diameter of the aperture provided at the bearing device can be alleviated to reduce the fabrication cost.

A gas vent plug according to still another aspect of the present invention corresponds to a gas vent plug mounted in an aperture communicating with a bearing cavity where a rolling element sandwiched between the outer race and inner race of the bearing is located. The gas vent plug includes a metal annular body, and an elastic tubular body constituted of an elastic member in tube form, integral with the metal annular body, and having a vent at one end face of the tube, protruding outwards in an axial direction of the tube. The elastic annular body is characterized in that the thickness of the tube portion is at least 95% the thickness of the tube portion of the metal annular body in a state where the elastic tubular body is not mounted in the aperture integral with the metal annular body.

Since the elastic tubular body has the thickness of tube portion set to at least 95% the thickness of the tube portion of the metal annular body in a state where the elastic tubular body is not mounted in the aperture integral with the metal annular body, a large interference is allowed for mounting in the aperture. Therefore, the working tolerance of the diameter of the aperture provided at the bearing or the bearing device can be alleviated to reduce the fabrication cost.

Effect of the Invention

According to the gas vent plug, bearing device, and bearing of the present invention, the gas at the bearing cavity can be discharged at the working pressure within a predetermined range without variation in the working pressure even if the interference is increased. Furthermore, the number of steps and the cost required to form a hole for mounting of the gas vent plug can be reduced.

DESCRIPTION OF THE REFERENCE CHARACTERS

1 inner race, 2 tapered roller (rolling element), 3 outer race, 4 cage, 5 seal base, 6, 6*a* lip, 6*b* reinforcement plate, 9 bearing cavity, 10 bearing device, 11, 111 gas vent plug, 12 metal annular body, 12*e* inner rim, 13 elastic tubular body, 14, 114 vent, 15 tube portion, 16 end face, 17 circular groove, 18 beveled portion, 19 seal member, 21 collar, 22 flange, 25 aperture, 31, 31*a*, 31*b*, 32 fixture member, 50 rotating shaft, 50*a* rotating shaft shoulder, 112 metal annulus, 113 rubber, 125 aperture, t, $t_2$ tube portion thickness, $t_1$ end face thickness, $t_{s1}$ beveled portion thickness, $t_{s2}$ differential thickness between outer diameter of metal annular body and diameter of aperture, $t_m$ tube portion thickness of metal annular body, d interference.

BEST MODES FOR CARRYING OUT THE INVENTION

Embodiments of the present invention will be described hereinafter with reference to the drawings.

First Embodiment

Figure 1:
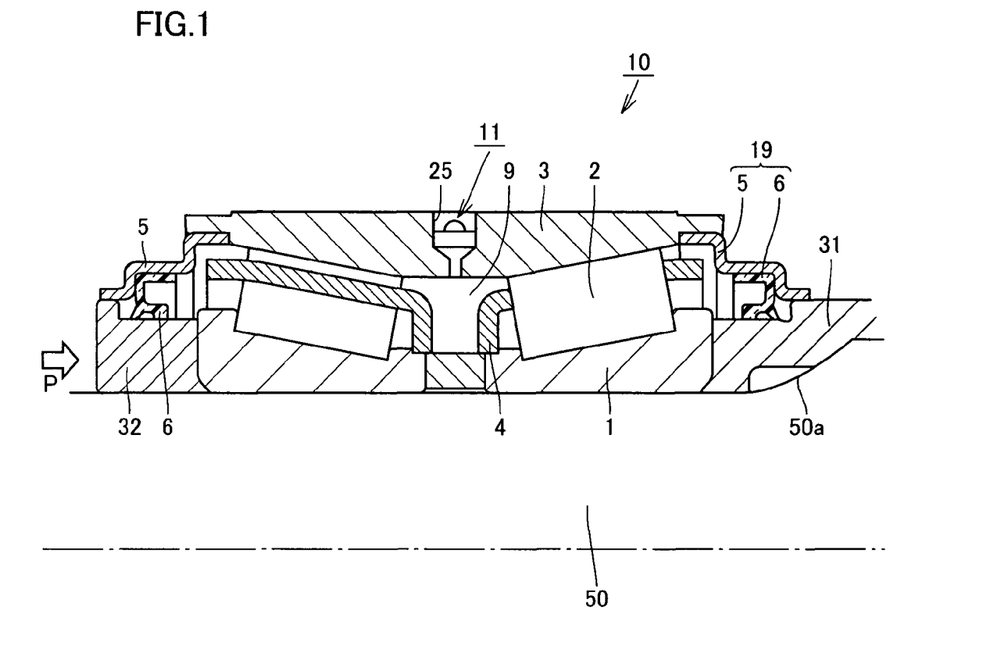
FIG. 1 is a sectional view of a bearing device according to a first embodiment of the present invention.

FIG. 1 is a partial sectional view of a bearing device according to a first embodiment of the present invention. Referring to FIG. 1, a bearing device 10 includes an inner race 1 located in contact with the perimeter of a rotating shaft 50, an outer race 3 arranged at the outer side, a tapered roller (rolling element) 2 held by a cage 4 in a bearing cavity 9 between inner race 1 and outer race 3, a seal member 19 attached to outer race 3 to seal the oil introduced into the bearing cavity, and fixture members 31, 32 to fix bearing device 10 to rotating shaft 50. A gas vent plug 11 for the escape of Gas when the pressure in bearing cavity 9 rises is placed in an aperture 25 provided at outer race 3, preventing detachment by a fitting structure.

Seal member 19 includes a seal base 5 attached to outer race 3, and a lip 6 formed of an elastic material, integral with seal base 5. Lip 6 includes those defined in JIS B 2402 (oil seal) such as those with spring-loaded rubber or reinforcement metal plate. Lip 6 slides with rotating fixture member 31 or 32 when rotating shaft 50 rotates.

Fixture of bearing device 10 to the rotating shaft is effected by a screw component not shown that is screwed to the rotating shaft. Force P is applied to fixture member 32 towards a shoulder 50*a* of rotating shaft 50 to urge inner race 1 towards fixture member 31 that cannot move by the abutment against shoulder 50*a* of the rotating shaft. By this fixture, inner race 1 and fixture members 31 and 32 rotate in association with the rotation of rotating shaft 50.

FIG. 1 corresponds to a configuration in which an aperture is provided in the outer race that is a component of the bearing, and a gas vent plug inserted therein by a fitting mechanism. The exemplified bearing device of FIG. 2 corresponds to a configuration in which a gas vent plug is arranged at a fixture member which is separate from the bearing.

Figure 2:
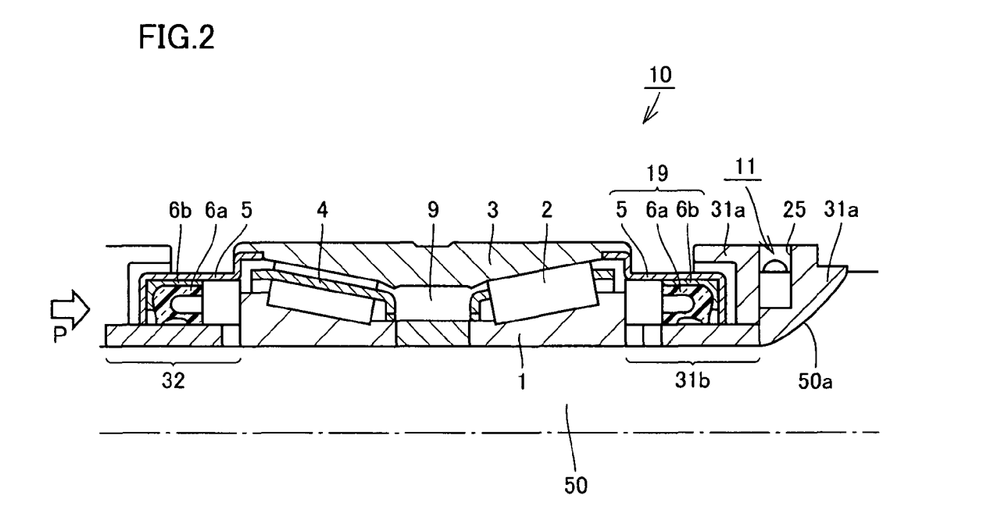
FIG. 2 is a sectional view of another bearing device according to the first embodiment of the present invention.

Referring to FIG. 2, bearing device 10 includes inner race 1 located in contact with the perimeter of rotating shaft 50, outer race 3 located at the outer side thereof, tapered roller 2 held by cage 4 in bearing cavity 9 between inner race 1 and outer race 3, seal member 19 attached to outer race 3 to seal the oil introduced into the bearing cavity, and fixture members 31a, 31b and 32 to fix bearing device 10 to rotating shaft 50. A gas vent plug 11 for the escape of gas when the pressure in bearing cavity 9 rises is placed in aperture 25 provided at fixture member 31a, preventing detachment by the fitting mechanism.

To seal member 19 are attached seal base 5 attached to outer race 3 and lip 6a formed of an elastic material, enforced by reinforcement plate 6b at seal base 5. Lip 6a includes those defined at JIS B 2402, as mentioned above. Lip 6a slides with rotating fixture member 31 or 32 when rotating shaft 50 rotates. At the outer side of seal base 5 is arranged the portion of fixture member 31a so as to cover seal base 5, which constitutes a labyrinth seal with seal base 5. Specifically, a portion of the fixture member functions as a member constituting the non-contact seal.

The seal may be any seal as long as it includes at least one of the type classified as the contact type (hermetic seal) of a dynamic seal (packing). For the aforementioned contact type seal, oil seal (JIS B 2402) having oil sealed therein as a lubricant agent is mainly employed. For grease lubrication, a grease seal (presented in JIS E 4704) is employed. Furthermore, a mechanical seal (JIS B 2405), molded packing (JIS B 2401, 2403, 2406) and the like may be employed instead of oil or grease. The material forming the sliding portion of the seal is selected appropriately according to the range of usage temperature and tolerable circumferential speed. For example, synthetic rubber (nitrile rubber, acrylic rubber, fluoro rubber, and the like), or felt may be employed.

The fixture of bearing device 10 of FIG. 2 to the rotating shaft is effected in a similar manner by a screw component not shown that is screwed to the rotating shaft. Force P is applied to fixture member 32 towards shoulder 50a of rotating shaft 50 to urge inner race 1 towards fixture members 31a and 31b rendered immobile by shoulder 50a of the rotating shaft. Inner race 1, and fixture members 31 and 32 rotate in accordance with the rotation of rotating shaft 50.

Bearing device 10 of the present embodiment shown in FIG. 2 includes inner race 1 fixed to rotating shaft 50 by means of fixture member 31 (31a, 31b)), 32 and shoulder 50a, tapered roller 2 located in bearing cavity 9 sandwiched between inner race 1 and outer race 3, and seal member 19 attached to outer race 3 to seal bearing cavity 9. Aperture 25 in which gas vent plug 11 is mounted is provided in fixture member 31a in the example of FIG. 2. In general, aperture 25 is provided at any of the outer race, inner race, seal member, and fixture member, or a member attached to any of the aforementioned members. The aperture set forth above communicates with the bearing cavity, and has a gas vent plug attached therein by a fitting mechanism.

Figure 3:
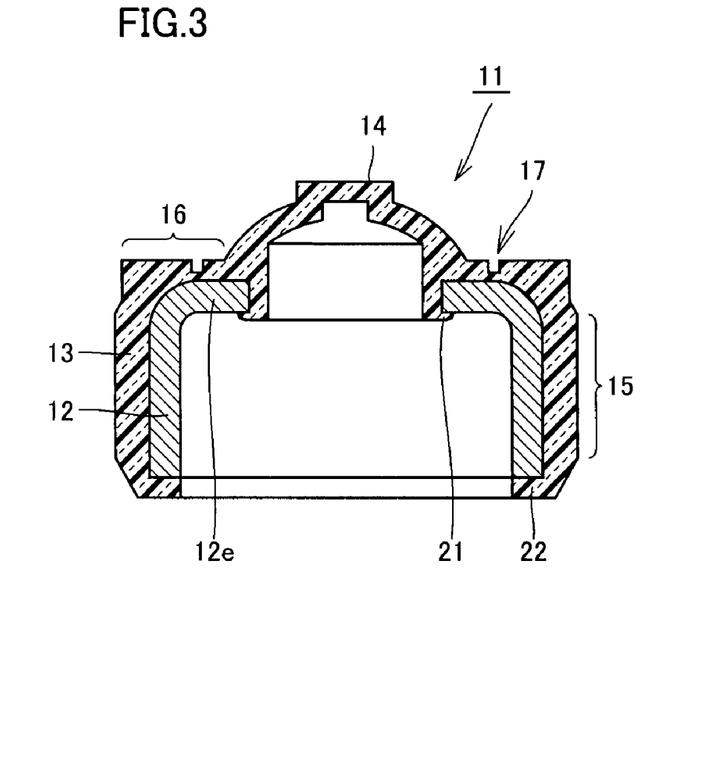
FIG. 3 is a sectional view of a gas vent plug according to the first embodiment of the present invention.

The configuration of the gas vent plug of the present embodiment will be described hereinafter with reference to FIGS. 3-6. Referring to FIG. 3, gas vent plug 11 of the present embodiment includes a metal annular body 12, and an elastic tubular body 13 constituted of an elastic member in tube form, integral with metal annular body 12, and having a vent 14 at one end face 16 of the tube, protruding outwards in the axial direction of the tube. A circular groove 17 is provided at one end face 16 of the elastic tubular body so as to encircle vent 14. Circular groove 17 preferably has a depth set to 20% to 60% the thickness of the end face around vent 14, and a width set to 30% to 80% the thickness of end face 16.

Metal annular body 12 includes an inner rim 12e at the end, protruding radially inwards. Inner rim 12e forms contact with the inner plane of one end face 16 of elastic tubular body 13 where vent 14 is arranged. Circular groove 17 is located to overlap inner rim 12e when viewed along the axial direction. By such a configuration, increase in deformation towards the vent caused by interference increase of the elastic tubular body can be suppressed more reliably.

Figure 4:
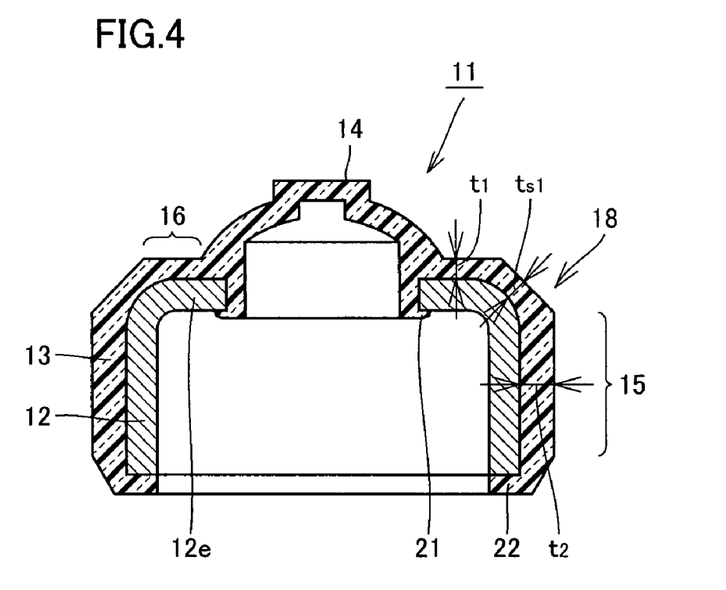
FIG. 4 is a sectional view of another gas vent plug according to the first embodiment of the present invention.

Referring to FIG. 4, another gas vent plug 1 of the present embodiment includes metal annular body 12, and elastic tubular body 13 constituted of an elastic member in tube form, integral with metal annular body 12, and having a vent 14 at one end face 16 of the tube, protruding outwards in the axial direction of the tube. A beveled portion 18 is provided at a shoulder qualified as the boundary between a tube portion 15 of the elastic tubular body and one end face 16. The thickness $t_{s1}$ of beveled portion 18 at the shoulder region is less than the thickness $t_2$ of the tube portion. Thickness $t_{s1}$ of the beveled portion is preferably set to approximately 1 mm to 1.5 mm. Thickness $t_2$ of the tube portion generally exceeds 1.5 mm, depending upon the machine to which the bearing device is disposed.

Thickness $t_1$ of one end face 16 of elastic tubular body 13 around vent 14 is less than thickness $t_2$ of the tube portion. Thickness $t_{s1}$ of the beveled portion may be approximately equal to thickness $t_1$ of one end face 16 around the vent.

Figure 5:
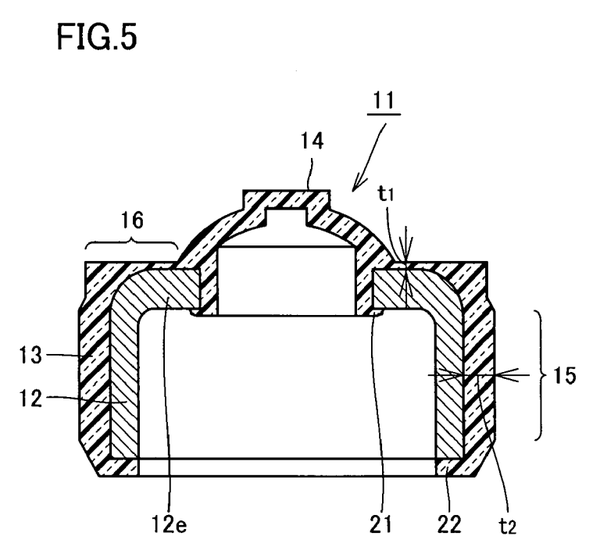
FIG. 5 is a sectional view of still another gas vent plug according to the first embodiment of the present invention.

Referring to FIG. 5, still another gas vent plug 11 of the present embodiment includes metal annular body 12, and elastic tubular body 13 constituted of an elastic member in tube form, integral with metal annular body 12, and having vent 14 at one end face 16 of the tube, protruding outwards in the axial direction of the tube. Thickness $t_1$ of elastic tubular body 13 at one end face 16 around vent 14 is not more than ½ the thickness $t_2$ of the tube portion. The conventional thickness of the end face around the vent portion absent of the configuration set forth above is 1 mm to 1.5 mm. In the case of the configuration set forth above, the thickness of the end face is preferably 30% to 50% (0.3 mm to 0.75 mm) of the general case.

Referring to FIGS. 3-5, any of the gas vent plugs set forth above includes an inner rim 12e protruding radially inwards at the end of metal annular body 12, and inner rim 12e is allowed to form contact with the inner plane of one end face 16 of elastic tubular body 13 where vent 14 is disposed.

In the case where inner rim 12e is provided, a collar 21 can be formed at the inner plane side of one end face 16 where the vent is arranged. Collar 21 holds inner rim 12e of the metal annular body in place from the inner side. Further, at the end of the side opposite to end face 16 where inner rim 12c of the metal annular body is located, a flange 22 for holding the other end of the elastic tubular body in place may be provided. This configuration ensures the mounting even if the hole diameter is increased by variation. This configuration also serves to suppress the movement of the elastic member even if the interference is increased.

In the bearing device of the present embodiment, any gas vent plug exemplified in FIGS. 3-5 is mounted in the aperture.

For the material of the elastic tubular body, various rubbers, elastic resin, and the like can be employed. For the metal annular body, an arbitrary metal or alloy such as of steel and aluminum may be employed.

Figure 6:
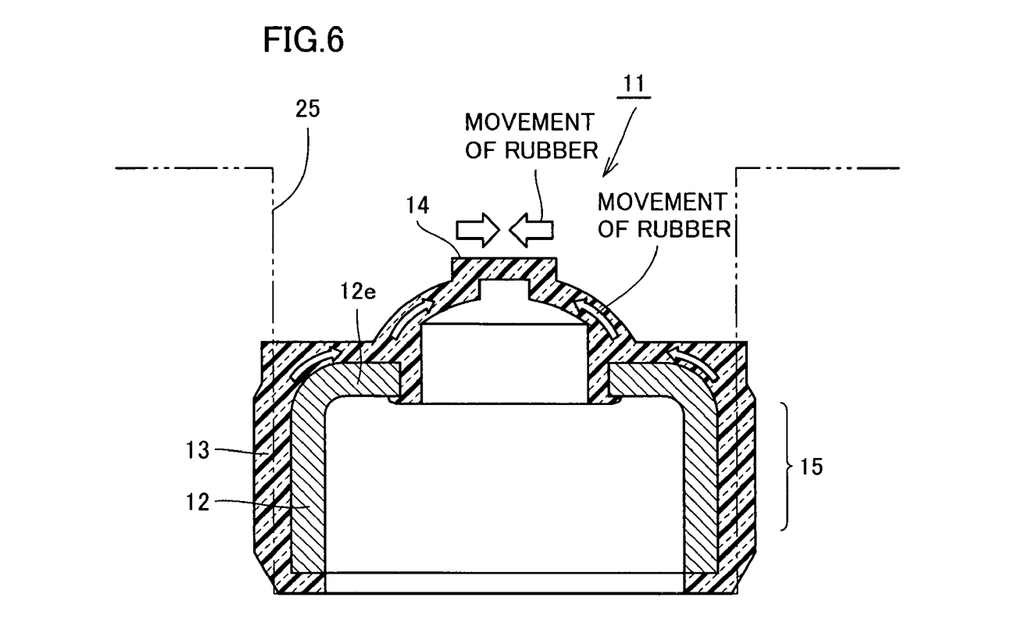
FIG. 6 is a diagram to describe the mechanism of the gas vent plug according to the first embodiment of the present invention.

The reason why the present embodiment is employed will be described hereinafter. FIG. 6 represents the relationship between the outer diameter of the gas vent plug and the hole diameter before and after gas vent plug 11 is mounted in aperture 25. The outer diameter of the rubber tubular body that is an elastic tubular body is apparently larger than the hole diameter prior to mounting in aperture 25. In a mounted state, the rubber tubular body is rendered thin by the squeeze of the tube portion 15. By the repelling force, gas vent plug 11 can be secured in aperture 25. The value of subtracting the rubber thickness subsequent to mounting from the rubber thickness prior to mounting is the interference (squeezed amount). By increasing the tolerable range of the diameter of aperture 25, the fabrication cost and the like can be reduced. In addition, the thickness of the rubber can be increased in consideration of the actual hole diameter arriving at the upper limit of the tolerable range to ensure mounting. It is to be noted that the interference is increased when the hole diameter corresponds to the lower limit of the tolerable range.

In the case where the configuration exemplified in FIGS. 3-5 as for the gas vent plug of the present embodiment is not employed, the rubber that is squeezed by the interference increase will move in the direction of vent 14 located at one end face, as shown in FIG. 6. This rubber movement acts to close the discrete part (not shown) such as a slit provided at the top of vent 14 (not shown). As a result, the discrete part is not opened at the expected working pressure, so that the pressure in the bearing cavity will rise. The inventors found out that variation in the working pressure is attributed to increase in the movement of the rubber caused by interference increase.

In the present embodiment, a circular groove 17 is provided in the rubber tubular body, around the vent (FIG. 3), and a beveled portion 18 is provided at the shoulder (FIG. 4), or thickness $t_1$ of end face 16 around vent 14 is reduced (FIG. 5) to ½ or below the thickness $t_2$ of tube portion 15. Accordingly, the movement of the elastic member (rubber) can be blocked.

Second Embodiment

Figure 7:
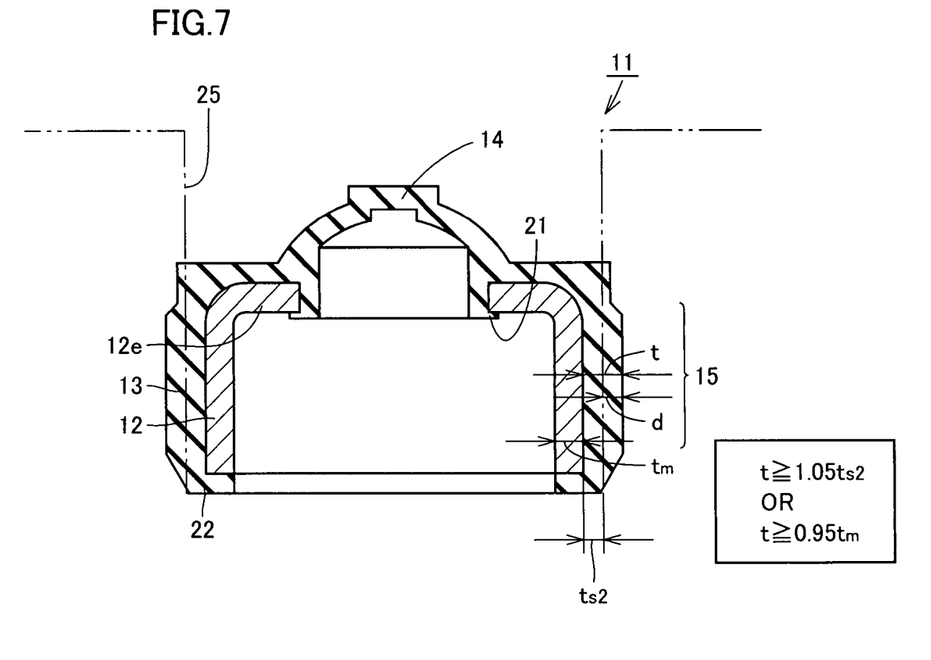
FIG. 7 represents the relationship between the outer diameter of the gas vent plug and the hole diameter before and after the gas vent plug according to a second embodiment of the present invention is mounted in the aperture.

A configuration of a gas vent plug according to a second embodiment of the present invention will be described with reference to FIGS. 7 and 8. Gas vent plug 11 of the present embodiment corresponds to a gas vent plug employed in a bearing device, as shown in FIG. 1 or 2. Gas vent plug 11 includes a metal annular body 12, and an elastic tubular body 13 constituted of an elastic member in tube form, integral with metal annular body 12, and having a vent 14 at one end face 16 of the tube, protruding outwards in the axial direction of the tube (vertical direction in the drawing). A discrete part such as a slit is provided at vent 14, which is opened when the pressure exceeds a predetermined level and closed when the pressure is lower than the predetermined level. FIG. 7 represents the relationship between the outer diameter of gas vent plug 11 and hole diameter before and after gas vent plug 11 is mounted in aperture 25. Referring to FIG. 7, the outer diameter of the rubber tubular body qualified as an elastic tubular body is apparently greater than the hole diameter before mounting in aperture 25. By the repelling force of the interference, gas vent plug 11 can be secured in aperture 25. The value of subtracting the rubber thickness subsequent to mounting from the rubber thickness prior to mounting is the interference (squeezed amount). In a mounted state, the rubber tubular body has the tube portion squeezed to be rendered thin. In FIG. 7, the interference (squeezed amount) is d. Thickness t of tube portion 15 generally exceeds 1.5 mm, depending upon the machine to which the bearing device is disposed.

By increasing the tolerable range of the diameter of aperture 25, the fabrication cost and the like can be reduced. In addition, the thickness of the rubber can be increased in consideration of the actual hole diameter arriving at the upper limit of the tolerable range to ensure mounting. In the case where the hole diameter corresponds to the lower limit of the tolerable range, the interference is increased.

In the bearing or bearing device of the present embodiment, elastic tubular body 13 has thickness t of tube portion 15 set to at least 105% of a differential thickness $t_{s2}$ between the diameter of aperture 25 and the outer diameter of metal annular body 12 in a state where the elastic tubular body 13 is not mounted in aperture 25 integral with metal annular body 12. This increase in thickness allows improvement in the mounting strength to prevent detachment reliably. This differential thickness is further preferably at least 107%, and more preferably at least 109%. As used herein, differential thickness $t_{s2}$ between the diameter of aperture 25 and the outer diameter of metal annular body 12 is $t_{s2}=(D-D_m)/2$, where D is the diameter of aperture 25 and $D_m$ is the outer diameter of metal annular body 12. If thickness t of tube portion 15 exceeds the aforementioned 125% of differential thickness $t_{s2}$, the mounting operation will become troublesome. Furthermore, there is a possibility of the vent working (open) pressure rising due to the flow of the elastic member (rubber) towards the vent in the mounting operation. Therefore, thickness t is set desirably to not more than 125%, more desirably not more than 122% the differential thickness $t_{s2}$.

Further, elastic tubular body 13 has thickness t of tube portion 15 set to at least 0.95 $t_m$, preferably at least $t_m$, where $t_m$ is the thickness of the tube portion of metal annular body 12, in a state where the elastic tubular body 13 is not mounted in aperture 25 integral with metal annular body 12. By increasing the thickness of elastic tubular body 13, the tolerance for forming the hole can be alleviated significantly without altering the vent function. The productivity can be improved and the cost for production can be reduced. By a larger interference of elastic tubular body 13, the range of usage can be increased since a higher vent escape pressure (working pressure) is allowed.

The elastic tubular body can include a flange 22 to hold the rim of metal annular body 12 in place. In FIGS. 7 and 8, flange 22 holding the other end of elastic tubular body 13 in place is provided at the end opposite to the end where inner rim 12e of metal annular body 12 is located. Flange 22 holds metal annular body 12 in contact through the entire thickness of metal annular body 12 at the end face. Furthermore, in the case where metal annular body 12 includes an inner rim 12e protruding radially inwards at the depth end of elastic tubular body 13, elastic tubular body 13 can include a collar 21 at the inner plane side of end face 16 where vent 14 is disposed to hold inner rim 12e of metal annular body 12 in place from the inner side. By this configuration, mounting can be ensured even if the hole diameter of aperture 25 is increased by variation. Further, the configuration serves to suppress movement of the elastic member even if the interference is increased.

For the material of elastic tubular body 13, various rubbers, elastic resin, and the like can be employed. For metal annular body 12, an arbitrary metal or alloy such as of steel and aluminum may be employed.

EXAMPLE 1

Example 1 of the present invention will be described hereinafter. The employed test samples are set forth below.

Sample 1 of the present invention: configuration shown in FIG. 3 (circular groove formed: tube portion thickness $t_2$ is thick).

Sample 2 of the present invention: configuration shown in FIG. 3 (circular groove formed: tube portion thickness $t_2$ is thick).

Sample 3 of the present invention: configuration shown in FIG. 4 (beveled formed: tube portion thickness $t_2$ is thick).

Sample 4 of the present invention: configuration shown in FIG. 5 (end face thickness $t_1$ around vent is thin: tube portion thickness $t_2$ is thick).

For comparison, test samples set forth below were produced.

Figure 9:
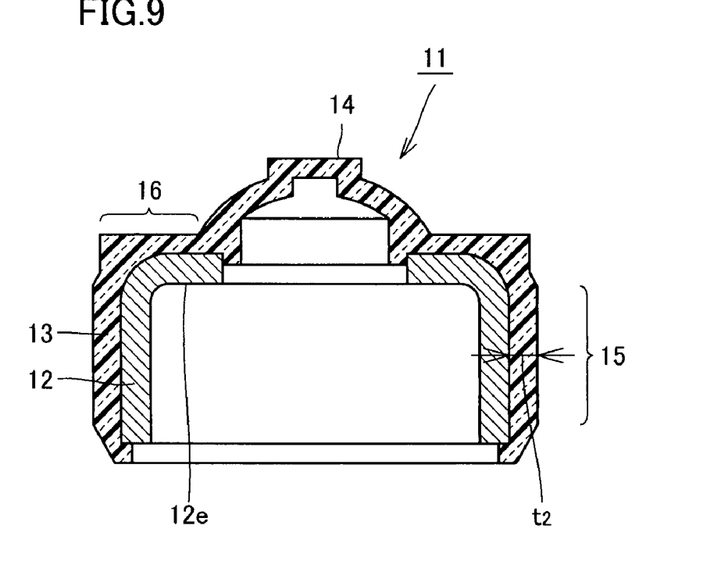
FIG. 9 is a diagram to describe a test sample of Comparative Sample 1 in Example 1 of the present invention.

Comparative Sample 1: configuration shown in FIG. 9 (tube thickness $t_2$ is moderate).

Figure 10:
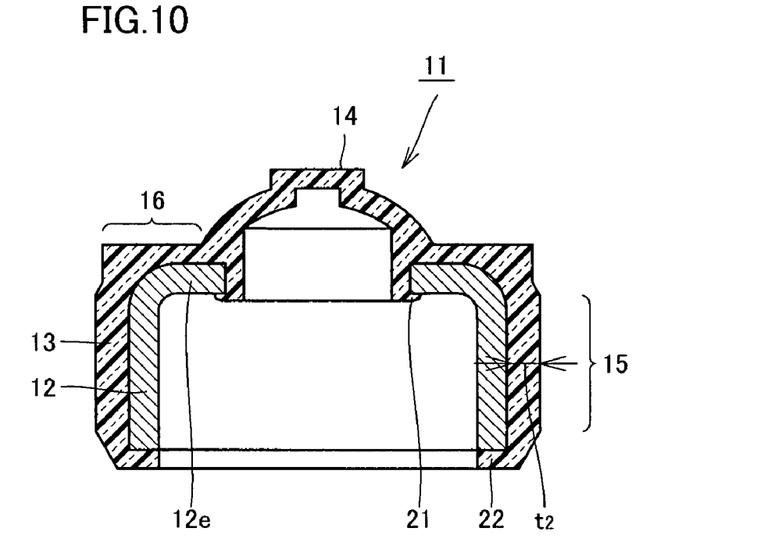
FIG. 10 is a diagram to describe a test sample of Comparative Sample 2 in Example 1 of the present invention.

Comparative Sample 2: configuration shown in FIG. 10 (tube thickness $t_2$ is thick).

Figure 11:
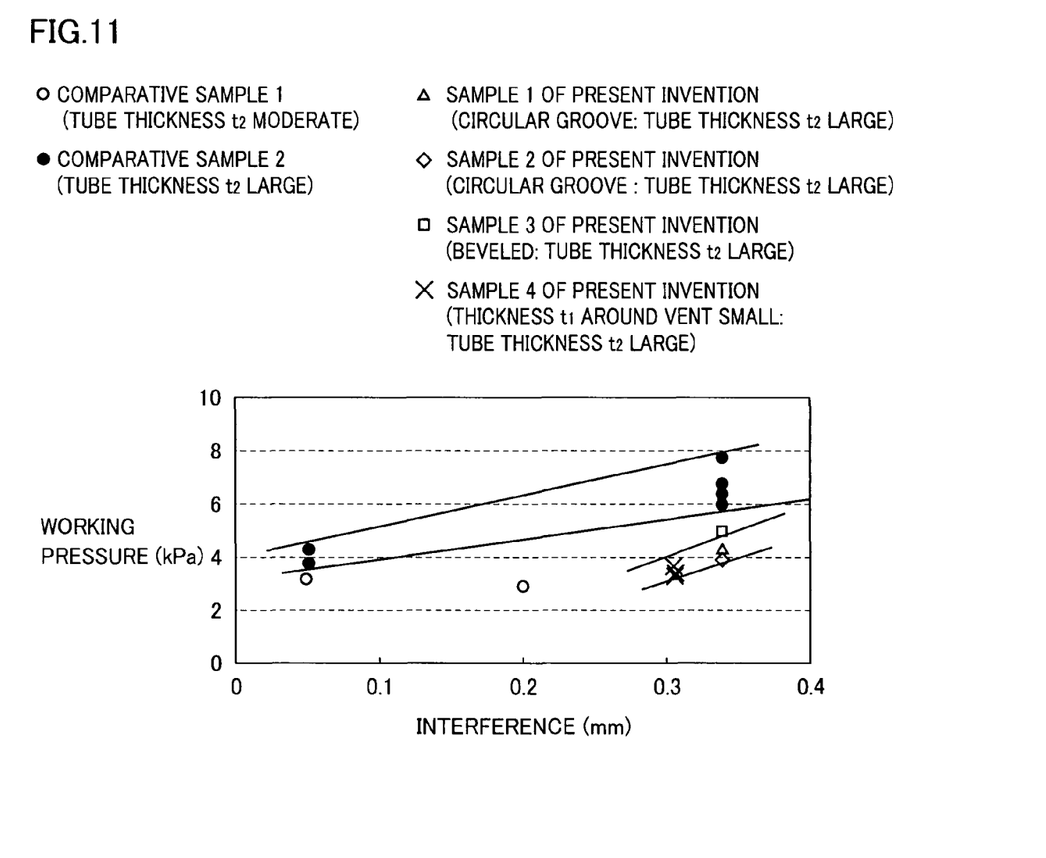
FIG. 11 represents the results of Example 1 of the present invention (relationship between interference and working pressure of each test sample).

The testing results of the working pressure with the six test samples set forth above, mounted in the aperture (grease attachment), are shown in FIG. 11. According to the results shown in FIG. 11, Comparative Sample 2 having a thick tube and no other corresponding measures exhibited the tendency of significant increase in the working pressure as the interference becomes larger. In other words, a tendency of variation is identified. For a test sample having a tube of moderate thickness such as Comparative Sample 1 corresponding to a conventional case, increase in the working pressure was not identified since the interference does not exceed 0.3 mm. Therefore, the mounting strength is ensured when the hole diameter is great whereas variation in the working pressure can be suppressed when the hole diameter is reduced.

In contrast, Samples 1-4 of the present invention had the working pressure suppressed to 5 atmospheres or below even when the interference is 0.3 mm and above. In the case of Sample 4 of the present invention with the lowest working pressure, a pressure below 4 kPa can be reliably ensured with an interference of 0.3 mm, suppressing variation in the working pressure. Results of low working pressure was obtained for Samples 1 and 2 of the present invention, absent of variation in the working pressure. The working pressure was suppressed even for Sample 3 of the present invention, substantially absent of variation in the working pressure.

Even in the range of interference higher than that of Comparative Sample 2, all of Samples 1 to 4 of the present invention allowed a working pressure of a level corresponding to that of when the interference is low. It was proved that the configuration set forth above of the gas vent plug of the present invention allowed reduction of variation in the working pressure with respect to the interference increase that may occur in accordance with alleviation of the working precision of the diameter of the aperture. It was found that, even if the working precision of the diameter of the aperture is alleviated, a predetermined working pressure range can be ensured stably at the bearing device.

Example 2

Example 2 of the present invention will be described hereinafter. The employed test samples are set forth below. Rubber and steel were employed for the elastic tubular body and metal annular body, respectively.

Figure 8:
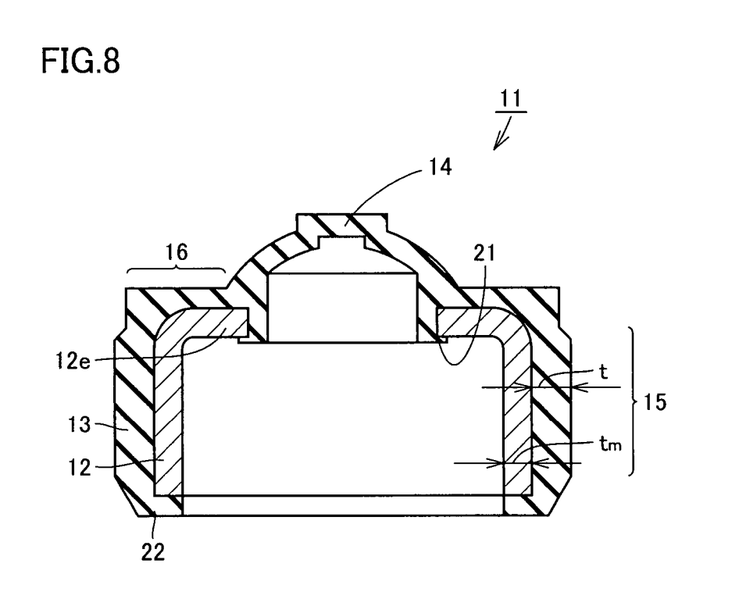
FIG. 8 is a sectional view of a gas vent plug according to the second embodiment of the present invention.

Sample A of present invention: configuration shown in FIG. 8 (tube portion thickness t is at least 105% the differential thickness $t_{s2}$ and at least 95% tube portion thickness $t_m$ of metal annular body 12).

The comparative sample for comparison is set forth below.

Figure 12:
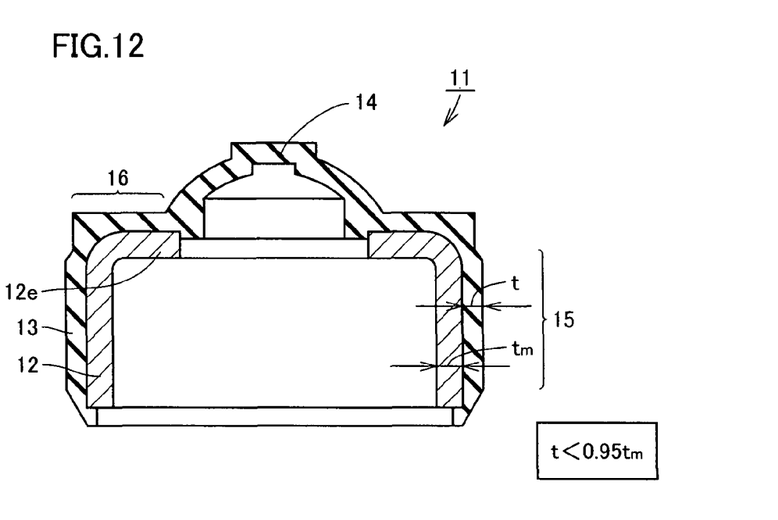
FIG. 12 exemplifies a gas vent plug of Comparative Sample B in Example 2 of the present invention.

Comparison Sample B: configuration shown in FIG. 12 (tube portion thickness t is below 105% the differential thickness $t_{s2}$ and thinner than 95% tube portion thickness $t_m$ of metal annular body 12).

The two types of test samples set forth above were mounted in aperture 25 having the diameter slightly altered in a step fashion (grease attachment) for examination of the mounting state. The examination results are set forth below.

In Sample A of the present invention, the hole tolerance could be increased in the range from level 1/100 to level 1/10 without change in the vent function. It is therefore no longer necessary for processing at high precision with numerous steps for fabrication of a hole. The productivity can be improved and the fabrication cost reduced. By increasing the rubber squeezed amount (interference), the rubber of tube portion 15 is deformed in the direction of vent 14, whereby a compressive force acts on vent 14 to increase the vent pressure. Therefore, the usage range can be increased.

It should be understood that the embodiments and examples disclosed herein are illustrative and non-restrictive in every respect. The scope of the present invention is defined by the terms of the claims, rather than the description above, and is intended to include any modification within the scope and meaning equivalent to the terms of the claims.

INDUSTRIAL APPLICABILITY

Since the present invention allows variation in the working pressure to be kept within a constant range even if the interference of the elastic tubular body constituting the outer side of the gas vent plug which is mounted in the aperture of the bearing device increases, an economic bearing device ensured in safety can be provided for railroad vehicles, industrial machines, and the like. Setting the thickness of the tube portion of the gas vent plug greater than a predetermined level even if the working tolerance of the aperture is alleviated can ensure mounting. Therefore, an economic bearing or bearing device can be provided for railroad vehicles, industrial machines, and the like.

The invention claimed is:

1. A gas vent plug for a bearing, mounted in an aperture communicating with a bearing cavity where a rolling element sandwiched between an outer race and an inner race is located, comprising:
a metal annular body, and
an elastic tubular body constituted of an elastic member in tube form, integral with said metal annular body, and having a vent at one end face of the tube, protruding outwards in an axial direction of the tube,
wherein a circular groove is provided at one end face of said elastic tubular body so as to encircle said vent.

2. The gas vent plug for a bearing according to claim 1, wherein said metal annular body includes an inner rim at an end thereof, protruding radially inwards, the inner rim brought into contact with an inner plane at the end face of said elastic tubular body where the vent is disposed.

3. The gas vent plug according to claim 2, including a collar at an inner plane side of the end face where said vent is disposed, holding the inner rim of said metal annular body in place from an inner side.

4. The gas vent plug for a bearing according to claim 2, wherein said circular groove is located to overlap said inner rim when viewed along the axial direction in a configuration in which the circular groove is disposed at the end face around said vent.

5. The gas vent plug according to claim 1, comprising a flange at said elastic tubular body to hold an end edge of said metal annular body in place.

6. A bearing device including an inner race fixed to a rotating shaft by a fixture member; an outer race; a rolling element located in a bearing cavity sandwiched between said inner race and outer race; a seal member sealing said bearing cavity; an aperture communicating with said bearing cavity, provided in any of said outer race, seal member, inner race, and fixture member, or in a member attached to any of said outer race, seal member, inner race, and fixture member; and the gas vent plug for a bearing defined in claim 1, in the aperture.

7. A gas vent plug for a bearing mounted in an aperture communicating with a bearing cavity where a rolling element sandwiched between an outer race and an inner race is located, comprising:
a metal annular body, and
an elastic tubular body constituted of an elastic member in tube form, integral with said metal annular body, and having a vent at one end face of the tube, protruding outwards in an axial direction of the tube, wherein a beveled portion is provided at a shoulder that is a boundary region between a tube portion of said elastic tubular body and said one end face, a thickness of the beveled portion at the shoulder is less than a thickness of said tube portion,
wherein a thickness of said one end face around the vent at said elastic tubular body is less than the thickness of said tube portion, and the thickness of said beveled portion is substantially equal to the thickness of said one end face.

8. The gas vent plug for a bearing according to claim 7, wherein said metal annular body includes an inner rim at an end thereof, protruding radially inwards, the inner rim brought into contact with an inner plane of the end face of said elastic tubular body where the vent is disposed.

9. The gas vent plug according to claim 8, including a collar at an inner plane side of the end face where said vent is disposed, holding the inner rim of said metal annular body in place from an inner side.

10. The gas vent plug according to claim 7, further comprising a flange at said elastic tubular body to hold an end edge of said metal annular body in place.

11. A bearing device including an inner race fixed to a rotating shaft by a fixture member; an outer race; a rolling element located in a bearing cavity sandwiched between said inner race and outer race; a seal member sealing said bearing cavity; an aperture communicating with said bearing cavity, provided in any of said outer race, seal member, inner race, and fixture member, or in a member attached to any of said outer race, seal member, inner race, and fixture member; and the gas vent plug for a bearing defined in claim 7, in the aperture.

12. A gas vent plug for a bearing mounted in an aperture communicating with a bearing cavity where a rolling element sandwiched between an outer race and an inner race is located, comprising:
a metal annular body, and
an elastic tubular body constituted of an elastic member in tube form, integral with said metal annular body, and having a vent at one end face of the tube, protruding outwards in an axial direction of the tube,
wherein a thickness at said one end face of said elastic tubular body around the vent is not more than ½ a thickness of a tube portion of the elastic tubular body.

13. The gas vent plug for a bearing according to claim 12, wherein said metal annular body includes an inner rim at an end thereof, protruding radially inwards, the inner rim brought into contact with an inner plane at the end face of said elastic tubular body where the vent is disposed.

14. The gas vent plug according to claim 13, including a collar at an inner plane side of the end face where said vent is disposed, holding the inner rim of said metal annular body in place from an inner side.

15. The gas vent plug according to claim 12, comprising a flange at said elastic tubular body to hold an end edge of said metal annular body in place.

16. A bearing device including an inner race fixed to a rotating shaft by a fixture member; an outer race; a rolling element located in a bearing cavity sandwiched between said inner race and outer race; a seal member sealing said bearing cavity; an aperture communicating with said bearing cavity, provided in any of said outer race, seal member, inner race, and fixture member, or in a member attached to any of said outer race, seal member, inner race, and fixture member; and the gas vent plug for a bearing defined in claim 12, in the aperture.

17. A bearing comprising an outer race, an inner race, and a gas vent plug mounted in an aperture communicating with a bearing cavity where a rolling element sandwiched between said outer race and said inner race is located,
wherein said gas vent plug comprises
a metal annular body, and
an elastic tubular body constituted of an elastic member in tube form, integral with said metal annular body, and having a vent at one end face of the tube, protruding outwards in an axial direction of the tube,
wherein said elastic tubular body has a thickness of a tube portion thereof set to at least 105% a differential thickness between a diameter of said aperture and an outer diameter of said metal annular body in a state where said elastic tubular body is not mounted in said aperture integral with said metal annular body.

18. The bearing according to claim 17, comprising a flange at said elastic tubular body to hold an end edge of said metal annular body in place.

19. The bearing according to claim 17, wherein said metal annular body includes an inner rim protruding radially inwards at a depth end of said elastic tubular body, and said elastic tubular body includes a collar at an inner plane side of the end face where said vent is disposed to hold the inner rim of said metal annular body from an inner side.

20. A bearing comprising an outer race, an inner race, and a gas vent plug mounted in an aperture communicating with a bearing cavity where a rolling element sandwiched between said outer race and said inner race is located,
wherein said gas vent plug comprises
a metal annular body, and
an elastic tubular body constituted of an elastic member in tube form, integral with said metal annular body, and having a vent at one end face of the tube, protruding outwards in an axial direction of the tube,
wherein said elastic tubular body has a thickness of a tube portion thereof set to at least 95% a thickness of a tube portion of said metal annular body in a state where said elastic tubular body is not mounted in said aperture integral with said metal annular body.

21. The bearing according to claim 20, comprising a flange at said elastic tubular body to hold an end edge of said metal annular body in place.

22. The bearing according to claim 20, wherein said metal annular body includes an inner rim protruding radially inwards at a depth end of said elastic tubular body, and said elastic tubular body includes a collar at an inner plane side of the end face where said vent is disposed to hold the inner rim of said metal annular body from an inner side.

23. A bearing device including an inner race fixed to a shaft by a fixture member; an outer race; a rolling element located in a bearing cavity sandwiched between said inner race and said outer race; a seal member sealing said bearing cavity; an aperture communicating with said bearing cavity, provided in any of said outer race, said seal member, said inner race, and said fixture member, or in a member attached to any of said outer race, said seal member, said inner race, and said fixture member; and a gas vent plug mounted in the aperture,
wherein said gas vent plug comprises
a metal annular body, and
an elastic tubular body constituted of an elastic member in tube form, integral with said metal annular body, and having a vent at one end face of the tube, protruding outwards in an axial direction of the tube,
wherein said elastic tubular body has a thickness of a tube portion thereof set to at least 105% a differential thickness between a diameter of said aperture and an outer diameter of said metal annular body in a state where said elastic tubular body is not mounted in said aperture integral with said metal annular body.

24. The bearing device according to claim 23, comprising a flange at said elastic tubular body to hold an end edge of said metal annular body in place.

25. The bearing device according to claim 23, wherein said metal annular body includes an inner rim protruding radially inwards at a depth end of said elastic tubular body, and said elastic tubular body includes a collar at an inner plane side of the end face where said vent is disposed to hold the inner rim of said metal annular body from an inner side.

26. A bearing device including an inner race fixed to a shaft by a fixture member; an outer race; a rolling element located in a bearing cavity sandwiched between said inner race and said outer race; a seal member sealing said bearing cavity; an aperture communicating with said bearing cavity, provided in any of said outer race, said seal member, said inner race, and said fixture member, or in a member attached to any of said outer race, said seal member, said inner race, and said fixture member; and a gas vent plug mounted in the aperture,
a metal annular body, and
an elastic tubular body constituted of an elastic member in tube form, integral with said metal annular body, and having a vent at one end face of the tube, protruding outwards in an axial direction of the tube, wherein said elastic tubular body has a thickness of a tube portion thereof set to at least 95% a thickness of a tube portion of said metal annular body in a state where said elastic tubular body is not mounted in said aperture integral with said metal annular body.

27. The bearing device according to claim 26, comprising a flange at said elastic tubular body to hold an end edge of said metal annular body in place.

28. The bearing device according to claim 26, wherein said metal annular body includes an inner rim protruding radially inwards at a depth end of said elastic tubular body, and said elastic tubular body includes a collar at an inner plane side of the end face where said vent is disposed to hold the inner rim of said metal annular body from an inner side.

29. A gas vent plug mounted in an aperture communicating with a bearing cavity where a rolling element sandwiched between an outer race and inner race of a bearing is located, comprising:
a metal annular body, and
an elastic tubular body constituted of an elastic member in tube form, integral with said metal annular body, and having a vent at one end face of the tube, protruding outwards in an axial direction of the tube,
wherein said elastic tubular body has a thickness of a tube portion thereof set to at least 95% a thickness of a tube portion of said metal annular body in a state where said elastic tubular body is not mounted in said aperture integral with said metal annular body.

30. The gas vent plug according to claim 29, comprising a flange at said elastic tubular body to hold an end edge of said metal annular body in place.

31. The gas vent plug according to claim 29, wherein said metal annular body includes an inner rim protruding radially inwards at a depth end of said elastic tubular body, and said elastic tubular body includes a collar at an inner plane side of the end face where said vent is disposed to hold the inner rim of said metal annular body from an inner side.

* * * * *